United States Patent
Mattsson et al.

(10) Patent No.: US 11,808,331 B2
(45) Date of Patent: Nov. 7, 2023

(54) TRANSMISSION ASSEMBLY

(71) Applicant: Volvo Construction Equipment AB, Eskilstuna (SE)

(72) Inventors: Per Mattsson, Sölvesborg (SE); Mathias Lehikoinen, Västerås (SE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 0 days.

(21) Appl. No.: 17/771,312

(22) PCT Filed: Oct. 22, 2020

(86) PCT No.: PCT/EP2020/079767
§ 371 (c)(1),
(2) Date: Apr. 22, 2022

(87) PCT Pub. No.: WO2021/078868
PCT Pub. Date: Apr. 29, 2021

(65) Prior Publication Data
US 2022/0389989 A1    Dec. 8, 2022

(30) Foreign Application Priority Data
Oct. 23, 2019   (WO) ................ PCT/EP2019/078824

(51) Int. Cl.
*F16H 3/48*      (2006.01)
*F16H 63/34*     (2006.01)

(52) U.S. Cl.
CPC ............. *F16H 3/48* (2013.01); *F16H 63/345* (2013.01); *F16H 2200/0021* (2013.01); *F16H 2200/2007* (2013.01); *F16H 2200/2035* (2013.01)

(58) Field of Classification Search
CPC ................ F16H 3/66; F16H 3/56; F16H 3/48
See application file for complete search history.

(56) References Cited

U.S. PATENT DOCUMENTS 5,509,860 A      4/1996  Legner
10,214,101 B2 *  2/2019  Fliearman ............... F16D 25/10
(Continued)

FOREIGN PATENT DOCUMENTS

CN    203384353 U    1/2014
CN    204357990 U    5/2015
(Continued)

OTHER PUBLICATIONS

International Search Report and Written Opinion of the International Searching Authority, PCT/EP2019/078824, dated Jul. 10, 2020, 17 pages.
(Continued)

*Primary Examiner* — Derek D Knight
(74) *Attorney, Agent, or Firm* — Sage Patent Group (57) ABSTRACT

A transmission assembly includes a common ring gear assembly, a first sun gear, a first planet carrier, a second sun gear and a second planet carrier. A set of planet gears of each one of the first and second planet carriers meshing with the common ring gear assembly. The set of planet gears of the first planet carrier meshing with the first sun gear and the set of planet gears of the second planet carrier meshing with the second sun gear. The transmission assembly further includes a transmission housing.

The second sun gear is adapted to be connected to a transmission input shaft;

the common ring gear assembly is adapted to be connected to a transmission output shaft, and the second planet carrier and the first sun gear are operatively connected to each other.

17 Claims, 7 Drawing Sheets

(56) References Cited

U.S. PATENT DOCUMENTS

| | | | | |
|---|---|---|---|---|
| 10,480,622 | B2* | 11/2019 | Kim | B60K 7/0007 |
| 10,953,745 | B2* | 3/2021 | Jasud | F16H 57/025 |
| 11,566,398 | B2* | 1/2023 | Mattsson | F16H 3/666 |
| 2018/0149240 | A1* | 5/2018 | Kubota | E02F 9/02 |
| 2018/0201127 | A1 | 7/2018 | Lubben et al. | |
| 2022/0332186 | A1* | 10/2022 | Mattsson | F16H 47/00 |
| 2022/0333670 | A1* | 10/2022 | Mattsson | B60K 17/06 |

FOREIGN PATENT DOCUMENTS

| | | | | |
|---|---|---|---|---|
| DE | 10103726 | A1 * | 8/2002 | B60K 17/046 |
| DE | 10103726 | A1 | 8/2002 | |
| DE | 102018120154 | A1 | 2/2020 | |
| EP | 2388497 | A1 | 11/2011 | |
| WO | 2018102498 | A1 | 6/2018 | |

OTHER PUBLICATIONS

International Search Report and Written Opinion of the International Searching Authority, PCT/EP2020/079767, dated Jan. 14, 2021, 12 pages.

First Office Action dated Sep. 13, 2023 for Chinese Patent Application No. 202080073708.3, 25 pages (includes English translation).

* cited by examiner

TRANSMISSION ASSEMBLY

CROSS REFERENCE TO RELATED APPLICATIONS

This application is a 35 U.S.C. § 371 national stage application of PCT International Application No. PCT/EP2020/079767 filed on Oct. 22, 2020, which in turn claims priority to International Patent Application No. PCT/EP2019/078824, filed on Oct. 23, 2019, the disclosures and content of which are incorporated by reference herein in their entirety.

TECHNICAL FIELD

The invention relates to a transmission assembly. Moreover, the present invention relates to a powertrain. Further, the present invention relates to a working machine.

The invention is applicable on working machines within the fields of industrial construction machines or construction equipment, in particular articulated haulers. Although the invention will be described with respect to an articulated hauler, the invention is not restricted to this particular machine, but may also be used in other working machines such as wheel loaders, excavators and backhoe loaders.

BACKGROUND

A transmission assembly can be used in many different applications. For instance, a transmission assembly may form part of a powertrain for propelling a vehicle, such as a working machine.

An example of such a transmission assembly is disclosed in WO 2018/102 498 A1. However, the solution as proposed by WO 2018/102 498 A1 does not necessarily ensure that gear shifts may be performed in an appropriate manner. Moreover, the transmission assembly disclosed in WO 2018/102 498 A1 may have limitations as regards the location of the assembly in relation to a vehicle, such as a working machine.

Moreover, according to its abstract, DE 101 03 726 A1 relates to a wheel hub drive having a two-stage planetary gearing incorporated in the wheel hub, provided with a common hollow wheel which is fixed to the wheel hub and two relatively rotatable planetary carriers.

SUMMARY

An object of the invention is to provide a transmission assembly that can provide at least two different gear conditions wherein the change between the two different gear conditions can be achieved in an appropriate manner.

According to a first aspect of the invention, the above object is achieved by a transmission assembly according to claim 1.

As such, the first aspect of the present invention relates to a transmission assembly comprising a common ring gear assembly, a first sun gear, a first planet carrier carrying a set of planet gears, a second sun gear and a second planet carrier carrying a set of planet gears. The set of planet gears of each one of the first and second planet carriers meshes with the common ring gear assembly. The set of planet gears of the first planet carrier meshes with the first sun gear and the set of planet gears of the second planet carrier meshes with the second sun gear. The transmission assembly further comprises a transmission housing. The transmission assembly is configured such that:

the second sun gear is adapted to be connected to a transmission input shaft;
the common ring gear assembly is adapted to be connected to a transmission output shaft;
the second planet carrier and the first sun gear are operatively connected to each other.

According to the first aspect of the present invention, the transmission assembly comprises a gear selection arrangement comprising:

a first locking mechanism being adapted to be controlled by a first fluid pressure conducted to the first locking mechanism such that:
    for at least a first fluid pressure equal to zero overpressure, the first locking mechanism is adapted to assume a locked condition in which the first planet carrier is locked to the transmission housing, and
a second locking mechanism being adapted to be controlled by a second fluid pressure conducted to the second locking mechanism such that:
    for at least a second fluid pressure equal to zero overpressure, the second locking mechanism is adapted to assume a locked condition in which the second planet carrier and the first sun gear are locked to the transmission housing.

A transmission assembly according to the above implies that a change between two different gear conditions can be achieved in a fast and smooth manner whilst still requiring few components. Moreover, the above configuration of the transmission assembly implies that a relatively compact transmission assembly may be obtained.

Additionally, the transmission assembly with the above recited implementations of the first and second locking mechanisms may be used in an energy efficient manner as a parking brake for instance. As such, in an embodiment in which a wheel or the like is connected to the transmission assembly according to the first aspect of the present invention, the first and second locking mechanisms may be used for locking such a wheel. As such, when it is desired that the common ring gear assembly be kept stationary for a certain amount of time, such a stationary condition may be achieved by simply reducing the first and second fluid pressures, possibly down towards or to zero overpressure. Thus, the common ring gear assembly may be kept stationary without the need for operating a fluid pressure source, such as a pump.

Optionally, the first locking mechanism is further adapted to assume a set of first locking mechanism non-locked conditions in which the first planet carrier is allowed to rotate relative to the transmission housing and wherein the second locking mechanism is further adapted to assume a set of second locking mechanism non-locked conditions in which the second planet carrier and the first sun gear are allowed to rotate relative to the transmission housing, whereby:

for a first fluid pressure equal to or higher than a first fluid pressure threshold, the first locking mechanism is adapted to assume a released condition in which the first planet carrier is free to rotate relative to the transmission housing, the released condition forming part of the set of first locking mechanism non-locked conditions, for at least one first intermediate pressure between zero overpressure and the first fluid pressure threshold, the first locking mechanism is adapted to assume a slipping condition in which a relative rotation is allowed but braking torque is applied between the transmission housing and the first planet carrier, the slipping condition forming part of the set of first locking mechanism non-locked conditions, for a second fluid pressure equal to or higher than a second fluid pressure threshold, the second locking mechanism is adapted to assume a released condition in which the second planet carrier and the first sun gear are free to rotate relative to the transmission housing, the released condition forming part of the set of second locking mechanism non-locked conditions, and for at least one second intermediate pressure between zero overpressure and the second fluid pressure threshold, the second locking mechanism is adapted to assume a slipping condition in which a relative rotation is allowed but braking torque is applied between the transmission housing and the second planet carrier and the first sun gear, the slipping condition forming part of the set of second locking mechanism non-locked conditions.

Optionally, the first locking mechanism comprises a first biasing member, preferably a first spring arrangement, adapted to bias the first locking mechanism so as to assume the locked condition and the second locking mechanism comprises a second biasing member, preferably a second spring arrangement, adapted to bias the second locking mechanism so as to assume the locked condition. The above-mentioned biasing members imply a cost and energy efficient implementation of the locking mechanisms in order to obtain the desired characteristics thereof.

Optionally, the first locking mechanism comprises a first brake disc and a first brake calliper and the second locking mechanism comprises a second brake disc and a second brake calliper.

Optionally, the transmission housing comprises a transmission housing wall assembly defining a transmission housing cavity enclosing at least the common ring gear assembly, the first sun gear, the first planet carrier, the second sun gear and the second planet carrier. At least an external portion of each one of the first and second locking mechanisms is located on one side of the transmission housing wall assembly and the transmission housing cavity is located on an opposite side of the transmission housing wall assembly.

By virtue of the above, at least a portion of each one of the first and second locking mechanisms may be kept outside, or on the outside of, the transmission housing. Such a position implies that e.g. repair and maintenance operations may be performed in a straightforward manner.

Optionally, the external portion of the first locking mechanism comprises the first brake disc and the first brake calliper and the external portion of the second locking mechanism comprises the second brake disc and the second brake calliper.

Optionally, the transmission housing cavity contains a transmission lubrication liquid, wherein at least the external portion of each one of the first and second locking mechanisms is adapted not to be in contact with the transmission lubrication liquid.

Optionally, the gear selection arrangement is adapted to assume a first gear condition in which the first locking mechanism assumes the locked condition and in which the second locking mechanism assumes one of the set of second locking mechanism non-locked conditions.

Optionally, the second locking mechanism assumes the slipping condition in the first gear condition.

Using the slipping condition of the second locking mechanism, it is possible to brake a transmission output shaft. As such, the second locking mechanism may be actuated in order to control the rotational speed of the transmission output shaft in the first gear condition.

Optionally, the gear selection arrangement is adapted to assume a second gear condition in which the second locking mechanism assumes the locked condition and in which the first locking mechanism assumes one of the set of first locking mechanism non-locked conditions.

Optionally, the first locking mechanism assumes the slipping condition in the second gear condition.

Using the slipping condition of the first locking mechanism, it is possible to brake a transmission output shaft. As such, the first locking mechanism may be actuated in order to control the rotational speed of the transmission output shaft in the second gear condition.

Optionally, the gear selection arrangement is adapted to assume a locked condition in which the first locking mechanism assumes the locked condition and the second locking mechanism assumes the locked condition.

Using the locked condition of both the first and second locking mechanisms, it is possible to hold the transmission output shaft stationary without the need for operating a fluid pressure source, as described earlier.

Optionally, the common ring gear assembly comprises a first ring gear and a second ring gear being rotationally fixedly connected to each other, the set of planet gears of the first planet carrier meshing with the first ring gear and the set of planet gears of the second planet carrier meshing with the second ring gear.

Optionally, the common ring gear assembly comprises a common ring gear.

A common ring gear implies that a relatively compact transmission assembly may be obtained.

Optionally, the transmission assembly further comprises the transmission input shaft and the transmission output shaft. The transmission input shaft is connected to the second sun gear and the transmission output shaft is connected to the common ring gear assembly.

A second aspect of the present invention relates to a powertrain comprising an electric motor, a set of ground engaging members and a transmission assembly according to the first aspect of the present invention comprising the transmission input shaft and the transmission output shaft as indicated above. The electric motor is adapted to feed power to the transmission input shaft and the transmission output shaft is adapted to feed power to the set of ground engaging members.

A powertrain according to the second aspect of the present invention can be achieved such that the overall dimensions of the powertrain may be kept relatively small.

Optionally, the electric motor is rotationally drivingly fixedly connected to the transmission input shaft.

Optionally, the transmission input shaft is adapted to rotate around an axis of rotation extending in an axis of rotation direction, wherein, as seen in the axis of rotation direction, the electric motor is located on the opposite side of the common ring gear assembly as compared to the first and second locking mechanisms.

The above configuration implies a compact powertrain that can be arranged in relation to e.g. a working machine in a versatile manner.

A third aspect of the present invention relates to a working machine comprising a transmission assembly according to the first aspect of the present invention and/or a powertrain according to the second aspect of the present invention. Preferably, the working machine comprises an axle which in turn is connected to one or more ground engaging members. Preferably, a portion of the transmission housing is fixedly connected to the axle.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
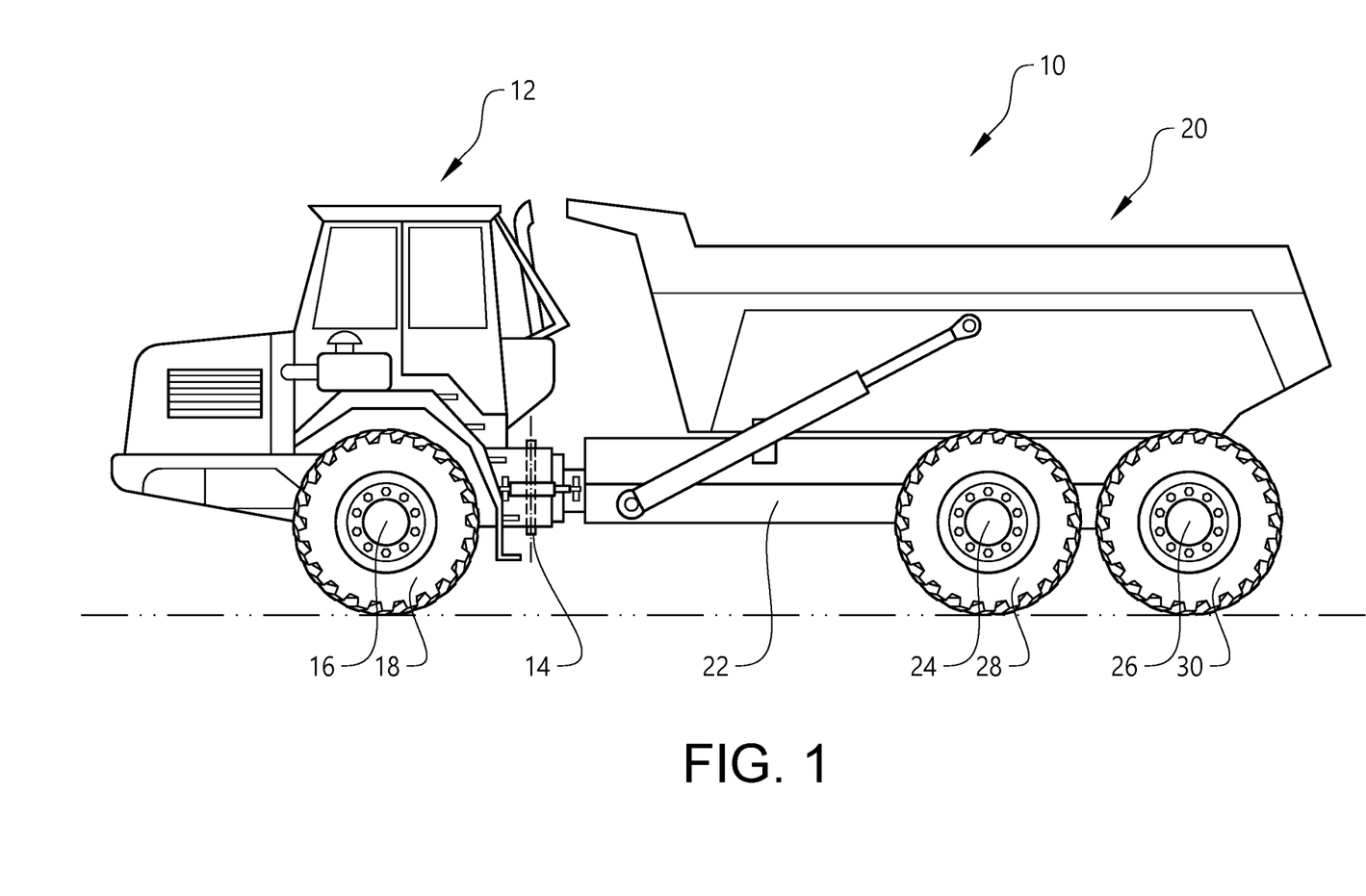
FIG. 1 is a side view of an articulated hauler.

FIG. 1 illustrates a side view of a vehicle 10 which is exemplified as a working machine. In particular, the FIG. 1 vehicle is exemplified as a frame-steered articulated hauler, also called dumper.

As may be gleaned from FIG. 1, the vehicle 10 illustrated therein comprises a front vehicle section 12 comprising a front frame 14 and a front axle 16. The front axle 16 is in turn connected to one or more front ground engaging members 18 adapted to propel the vehicle 10. In the FIG. 1 example, the one or more front ground engaging members 18 is exemplified as a pair of front wheels, although only the left front wheel is visible in FIG. 1.

Moreover, as may be gleaned from FIG. 1, the vehicle 10 comprises a rear vehicle section comprising a rear frame 22, a front rear axle 24 and a back rear axle 26. The front rear axle 24 is connected to one or more front rear ground engaging members 28. Moreover, the back rear axle 26 is connected to one or more back rear ground engaging members 30. In the FIG. 1 embodiment, the one or more front rear ground engaging members 28 is exemplified as a pair of wheels. In a similar vein, the one or more back rear ground engaging members 30 is exemplified as a pair of wheels.

Although the FIG. 1 embodiment of the vehicle 10 comprises two rear axles 24, 26, it is also envisaged that embodiments of the vehicle may be equipped with only one rear axle (not shown). Furthermore, although the FIG. 1 embodiment exemplifies each one of the ground engaging members 18, 28, 30 as a wheel, it is also contemplated that in embodiments of the vehicle 10, one or more of the ground engaging members 18, 28, 30 may comprise crawlers (not shown) or any other type of means for ground engagement.

Figure 2:
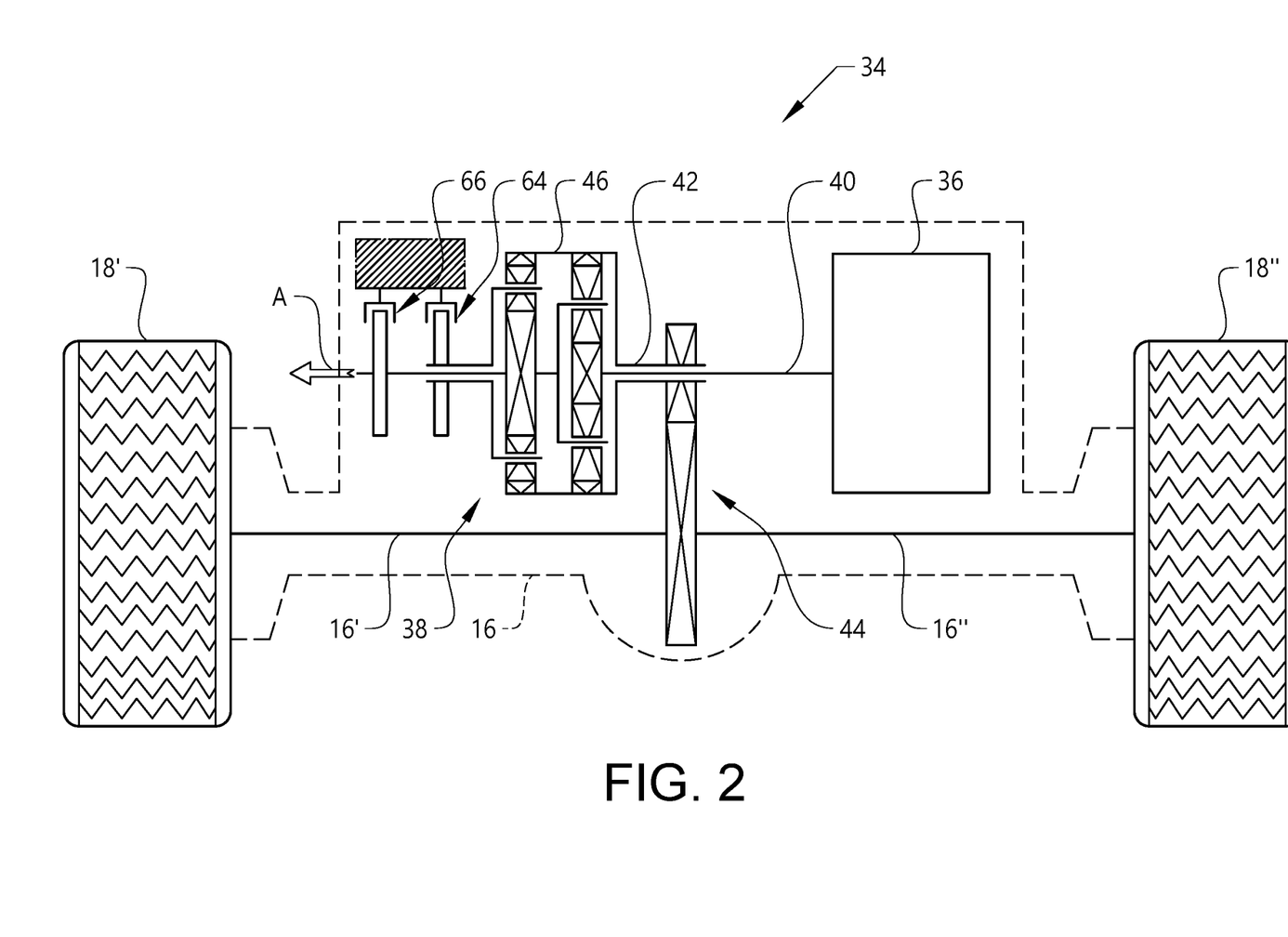
FIG. 2 is a schematic side view of a powertrain comprising a transmission assembly.

The FIG. 1 vehicle 10 may be propelled by one or more powertrains. To this end, FIG. 2 illustrates an embodiment of such a powertrain 34. The FIG. 2 powertrain is exemplified as being adapted to propel the ground engaging members 18', 18" associated with the front axle 16. However, the FIG. 2 powertrain may be used for propelling any ground engaging member or members, for instance the ground engaging members associated with any one of the other axles 24, 26 of the FIG. 1 vehicle 10.

Irrespective of the intended use, the FIG. 2 powertrain 34 comprises an electric motor 36, a set of ground engaging members 18', 18" and a transmission assembly 38 comprising a transmission input shaft 40 and a transmission output shaft 42. The electric motor 36 is adapted to feed power to the transmission input shaft 40 and the transmission output shaft 42 is adapted to feed power to the set of ground engaging members 18', 18".

Purely by way of example, and as indicated in FIG. 2, an output shaft of the electric motor 36 may be rotationally fixedly connected to the transmission input shaft 40. However, it is also envisaged that the output shaft of the electric motor 36 may be connected to the transmission input shaft 40 via one or more other components, such as one or more transmission components (not shown in FIG. 2).

Furthermore, though again by way of example, the transmission output shaft 42 may be connected to the set of ground engaging members 18', 18" via a gear set 44, such as a cylindrical gear set 44, and further via drive shafts 16', 16" accommodated within and/or forming part of the previously discussed axle 16. However, it is also envisaged that the transmission output shaft 42 may be connected to the set of ground engaging members 18', 18" in other ways. For instance, it is contemplated that embodiments of the powertrain 34 may comprise a transmission output shaft 42 that is adapted to be connected to the set of ground engaging members 18', 18" using other or fewer intermediate components than what has been exemplified above with reference to FIG. 2. As a non-limiting example, it is envisaged that the transmission output shaft 42 may be rotationally fixedly connected to a ground engaging member 18', 18". For instance, it is contemplated that the powertrain 34 may form a hub motor assembly for a vehicle, such as a working machine.

Figure 3:
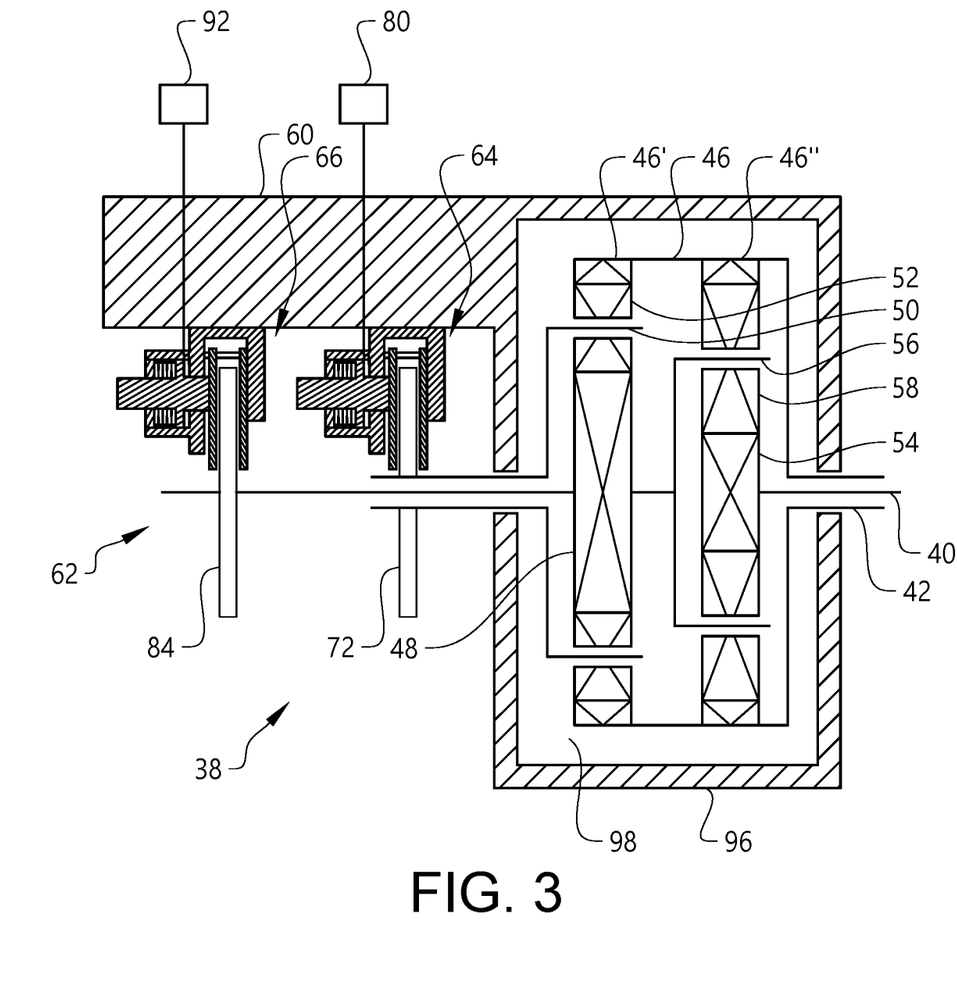
FIG. 3 is a schematic side view of a transmission assembly.

FIG. 3 illustrates an embodiment of a transmission assembly 38 according to the present invention. Purely by way of example, the FIG. 3 transmission assembly 38 may form part of a powertrain, such as the FIG. 2 powertrain 34 for instance. However, it should be noted that the transmission assembly 38 according to the present invention may also be used in other applications.

As may be gleaned from FIG. 3, the transmission assembly 38 comprises a common ring gear assembly 46, a first sun gear 48, a first planet carrier 50 carrying a set of planet gears 52, a second sun gear 54 and a second planet carrier 56 carrying a set of planet gears 58. The set of planet gears 52, 58 of each one of the first and second planet carriers 50, 56 meshes with the common ring gear assembly 46.

The common ring gear assembly 46 may be implemented in a plurality of different ways. As a first non-limiting example, the common ring gear assembly comprises a common ring gear. As such, a single ring gear is used for the planet gears 52, 58 of each one of the first and second planet carriers 50, 56.

To this end, though purely by way of example, the common ring gear 46 may comprise a first gear race (not shown) and a second gear race (not shown). The set of planet gears 52 of the first planet carrier 50 may mesh with the first gear race and the set of planet gears 58 of the second planet carrier 56 may mesh with the second gear race.

As another alternative, the common ring gear may comprise a common gear race (not shown). The set of planet gears 52, 58 of each one of the first and second planet carriers 50, 56 may mesh with the common gear race.

As an alternative to the above, the common ring gear assembly 46 may comprise a first ring gear 46' and a second ring gear 46" being rotationally fixedly connected to each other. Further, though again purely by way of example, the set of planet gears 52 of the first planet carrier 50 meshes with the first ring gear 46' and the set of planet gears 58 of the second planet carrier 56 meshes with the second ring gear 46". FIG. 3 indicates that the diameter of the first ring gear 46' may be approximately the same as the diameter of the second ring gear 46". However, it is also contemplated that the diameter of the first ring gear 46' may be larger or smaller than the diameter of the second ring gear 46".

The set of planet gears 52 of the first planet carrier 50 meshes with the first sun gear 48 and the set of planet gears 58 of the second planet carrier 56 meshes with the second sun gear 54.

The transmission assembly 38 further comprises a transmission housing 60. Moreover, the transmission assembly 38 is configured such that:
the second sun gear 54 is adapted to be connected to a transmission input shaft 40;
the common ring gear assembly 46 is adapted to be connected to a transmission output shaft 42, and
the second planet carrier 56 and the first sun gear 48 are operatively connected to each other.

Purely by way of example, a portion of the transmission housing 60 may be fixedly connected to an axle 16, 24, 26 of a vehicle 10.

It is also envisaged that the transmission assembly 38 may further comprise the transmission input shaft 40 and the transmission output shaft 42. In such an event, the transmission input shaft 40 is connected, e.g. rotationally fixedly connected, to the second sun gear 54 and the transmission output shaft 42 is connected, e.g. rotationally fixedly connected, to the common ring gear assembly 46.

Purely by way of example, and as indicated in FIG. 3, the second planet carrier 56 and the first sun gear 48 can be operatively connected by being rotationally fixedly connected to each other.

Furthermore, and as indicated in FIG. 3, the transmission assembly 38 comprises a gear selection arrangement 62 comprising:
a first locking mechanism 64 being adapted to be controlled by a first fluid pressure conducted to the first locking mechanism 64 such that:
for at least a first fluid pressure equal to zero overpressure, the first locking mechanism 64 is adapted to assume a locked condition in which the first planet carrier 50 is locked to the transmission housing 60, and
a second locking mechanism 66 being adapted to be controlled by a second fluid pressure conducted to the second locking mechanism 66 such that:
for at least a second fluid pressure equal to zero overpressure, the second locking mechanism 66 is adapted to assume a locked condition in which the second planet carrier 56 and the first sun gear 48 are locked to the transmission housing 60.

Moreover, though purely by way of example, the FIG. 3 implementation of the gear selection arrangement 62 is such that the first locking mechanism 64 is further adapted to assume a set of first locking mechanism non-locked conditions in which the first planet carrier 50 is allowed to rotate relative to the transmission housing 60 and wherein the second locking mechanism 66 is further adapted to assume a set of second locking mechanism non-locked conditions in which the second planet carrier 56 and the first sun gear 48 are allowed to rotate relative to the transmission housing 60, whereby:
for a first fluid pressure equal to or higher than a first fluid pressure threshold, the first locking mechanism 64 is adapted to assume a released condition in which the first planet carrier 50 is free to rotate relative to the transmission housing 60, the released condition forming part of the set of first locking mechanism non-locked conditions,
for at least one first intermediate pressure between zero overpressure and the first fluid pressure threshold, the first locking mechanism 64 is adapted to assume a slipping condition in which a relative rotation is allowed but braking torque is applied between the transmission housing 60 and the first planet carrier 50, the slipping condition forming part of the set of first locking mechanism non-locked conditions,
for a second fluid pressure equal to or higher than a second fluid pressure threshold, the second locking mechanism 66 is adapted to assume a released condition in which the second planet carrier 56 and the first sun gear 48 are free to rotate relative to the transmission housing 60, the released condition forming part of the set of second locking mechanism non-locked conditions, and
for at least one second intermediate pressure between zero overpressure and the second fluid pressure threshold, the second locking mechanism 66 is adapted to assume a slipping condition in which a relative rotation is allowed but braking torque is applied between the transmission housing 60 and the second planet carrier 56 and the first sun gear 48, said slipping condition forming part of said set of second locking mechanism non-locked conditions.

The first locking mechanism 64 may be implemented in a plurality of ways. Purely by way of example, the first locking mechanism 64 may be implemented as an on-off locking mechanism, such as a dog clutch, adapted to assume either a fully locked or a fully released condition. As such, though purely by way of example, the set of first locking mechanism non-locked conditions may contain only one non-locked condition, e.g. a fully released condition as exemplified above.

In a similar vein, the second locking mechanism 66 may be implemented in a plurality of ways. Purely by way of example, the second locking mechanism 66 may be implemented as an on-off locking mechanism, such as a dog clutch, adapted to assume either a fully locked or a fully released condition. As such, though purely by way of example, the set of second locking mechanism non-locked conditions may contain only one non-locked condition, e.g. a fully released condition as exemplified above.

Purely by way of example, each one of the first locking mechanism 64 and the second locking mechanism 66 is a parking brake. As such, each one of the first and second locking mechanisms 64, 66 may be implemented such that it assumes a locked condition at least when a fluid pressure conducted to the locking mechanism is equal to zero overpressure. Implementations of the first and second locking mechanisms 64, 66 are presented hereinbelow with reference to FIG. 3A.

Figure 3A:
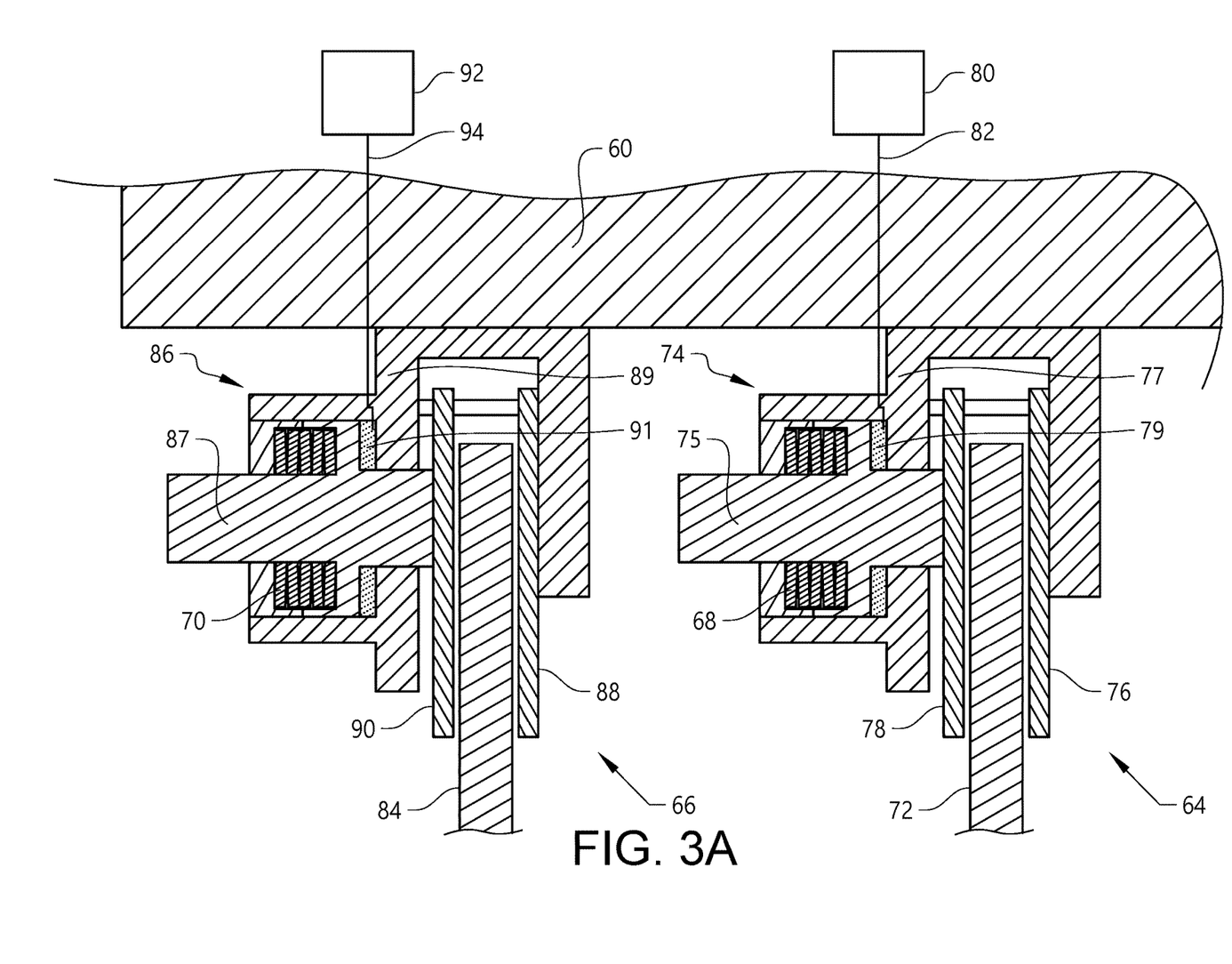
FIG. 3A illustrates a portion of the FIG. 3 embodiment.

As may be gleaned from FIG. 3A, the first locking mechanism 64 comprises a first biasing member 68, which first biasing member 68 is implemented as a first spring arrangement in FIG. 3A, adapted to bias the first locking mechanism 64 so as to assume the locked condition and wherein the second locking mechanism 66 comprises a second biasing member 70, which second biasing member 70 is implemented as a second spring arrangement in FIG. 3A, adapted to bias the second locking mechanism 66 so as to assume the locked condition.

In the FIG. 3A implementation, the first biasing member 68 is implemented as a disc spring, although other types of biasing members are also envisaged, such as a helical spring or the like. In a similar vein, in the FIG. 3A implementation, the second biasing member 70 is implemented as a disc spring, although other types of biasing members are also envisaged, such as a helical spring or the like.

In the FIG. 3A implementation, the first locking mechanism 64 comprises a first brake disc 72 and a first brake calliper 74. The first brake calliper 74 includes a first calliper body 77 that holds two brake pads 76, 78 located on opposite sides of the first brake disc 72. A first piston 75 is positioned within the first calliper body 77. The first piston 75 is biased in a direction towards the first brake disc 72 by means of the first biasing member 68 to thereby bias the brake pad 78 towards the first brake disc 72. Purely by way of example, in order to apply a braking torque to the first brake disc 72, the first brake calliper 74 may be fixedly connected to the transmission housing 60 in at least the direction of the needed reaction force.

Moreover, the FIG. 3A implementation of the first brake calliper 74 is a so called floating calliper. As such, the FIG. 3A implementation of the first brake calliper 74 can move with respect to the first brake disc 72, along a line parallel to the axis of rotation of the first brake disc 72. Thus, when the first biasing member 68 has pushed one of the brake pads 78, via the first piston 75, such that it makes contact with the first brake disc 72, the first calliper body 77 then slides and pulls the other brake pad 76 so that pressure is applied to both sides of the first brake disc 72.

However, it should be noted that other implementations are also envisaged. Purely by way of example, the implementations of the first locking mechanism 64 may comprise two biasing members (not shown), each one of which being adapted to bias an individual brake pad 76, 78 towards the first brake disc 72. As such, the first brake calliper 74 need not necessarily be a so called floating calliper.

The first brake calliper 74 is in turn connected to a first fluid source 80, for instance via a fluid conduit 82 as exemplified in FIG. 3A. Purely by way of example, the first fluid source 80 may be a tank or a pump and the fluid may for instance be a gas, such as air, or a liquid, such as a hydraulic fluid, for instance hydraulic oil. In the FIG. 3A implementation, the first brake calliper 74 controls the two brake pads 76, 78 such that when the first brake calliper 74 is fed with fluid having a fluid pressure from the fluid source 80, the first brake calliper 74 releases the two brake pads 76, 78 from contact with the first brake disc 72.

In the FIG. 3A implementation of the first locking mechanism 64, the first fluid source 80 is fluidly connected to a first fluid cavity 79 formed between the first piston 75 and the first calliper body 77. As such, a fluid pressure applied in the first fluid cavity 79 will impart a force onto the first piston 75 in a direction opposite to the force generated by the first biasing member 68, thus forcing the two brake pads 76, 78 away from each other.

In the FIG. 3A implementation, the first biasing member 68 and the first fluid pressure applied in the first fluid cavity 79 interact such that:

For at least a first fluid pressure equal to zero overpressure, the first locking mechanism 64 is adapted to assume the above-mentioned locked condition. In such a condition, the biasing force from the first biasing member 68 exceeds the force by which the first fluid pressure releases the two brake pads 76, 78 from the first brake disc 72. It should also be noted that the first locking mechanism 64 may be adapted to assume the above-mentioned locked condition also when a first fluid pressure is greater than zero overpressure.

For a first fluid pressure equal to or higher than the first fluid pressure threshold, the first locking mechanism 64 is adapted to assume a released condition in which the first planet carrier 50 is free to rotate relative to the transmission housing 60. In such a condition, the biasing force from the first biasing member 68 does not exceed the force by which the first fluid pressure releases the two brake pads 76, 78 from the first brake disc 72 such that there is no contact between the first brake disc 72 and any one of the brake pads 76, 78.

For at least one first intermediate pressure between zero overpressure and the first fluid pressure threshold, the first locking mechanism 64 is adapted to assume a slipping condition in which a relative rotation is allowed but braking torque is applied between the transmission housing 60 and the first planet carrier 50. In a slipping condition, there is contact between the first brake disc 72 and at least one of, preferably both, the brake pads 76, 78 but wherein the first brake disc 72 nevertheless is allowed to rotate relative to the brake pads 76, 78.

In a similar vein as for the first locking mechanism 64, in the FIG. 3A implementation, the second locking mechanism 66 comprises a second brake disc 84 and a second brake calliper 86. The second brake calliper 86 includes a second calliper body 89 that holds two brake pads 88, 90 located on opposite sides of the second brake disc 84. A second piston 87 is positioned within the second calliper body 89. The second piston 87 is biased in a direction towards the second brake disc 84 by means of the second biasing member 70 to thereby bias the brake pad 90 towards the second brake disc 84. Purely by way of example, in order to apply a braking torque to the second brake disc 84, the second brake calliper 86 may be fixedly connected to the transmission housing 60 in at least the direction of the needed reaction force.

Moreover, the FIG. 3A implementation of the second brake calliper 86 is a so called floating calliper. As such, the FIG. 3A implementation of the second brake calliper 86 can move with respect to the second brake disc 84, along a line parallel to the axis of rotation of the second brake disc 84. As such, when the second biasing member 70 has pushed one of the brake pads 90, via the second piston 87, such that it makes contact with the second brake disc 84, the second calliper body 89 then slides and pulls the other brake pad 88 so that pressure is applied to both sides of the second brake disc 84.

However, it should be noted that other implementations are also envisaged. Purely by way of example, the implementations of the second locking mechanism 66 may comprise two biasing members (not shown), each one of which being adapted to bias an individual brake pad towards the second brake disc 84. As such, the second brake calliper 86 need not necessarily be a so called floating calliper.

The second brake calliper 86 is in turn connected to a second fluid source 92, for instance via a fluid conduit 94 as exemplified in FIG. 3A. Purely by way of example, the second fluid source 92 may be a tank or a pump and the fluid may for instance be a gas, such as air, or a liquid, such as a hydraulic fluid, for instance hydraulic oil.

In the FIG. 3A implementation of the second locking mechanism 66, the second fluid source 92 is fluidly connected to a second fluid cavity 91 formed between the second piston 87 and the second calliper body 89. As such, a fluid pressure applied in the second fluid cavity 91 will impart a force onto the second piston 87 in a direction opposite to the force generated by the second biasing member 70, thus releasing the two brake pads 88, 90 from contact with the second brake disc 84.

Although the first and second fluid sources 80, 92 are illustrated as separate entities in FIG. 3A, it is also envisaged that the embodiments of the transmission assembly 38 may comprise a single fluid source feeding fluid to each one of the first and second locking mechanisms 64, 66.

In the FIG. 3A implementation, the second brake calliper 86 controls the two brake pads 88, 90 such that when the second brake calliper 86 is fed with fluid having a fluid pressure from the fluid source 92, the second brake calliper 86 forces the two brake pads 88, 90 away from each other.

In the FIG. 3A implementation, the second biasing member 70 and the second fluid pressure applied in the second fluid cavity 91 interact such that:

For at least a second fluid pressure equal to zero overpressure, the second locking mechanism 66 is adapted to assume a locked condition in which the second planet carrier 56 and the first sun gear 48 are locked to the transmission housing 60. In such a condition, the biasing force from the second biasing member 70 exceeds the force by which the second fluid pressure releases the two brake pads 88, 90 from contact with the second brake disc 84. It should also be noted that the second locking mechanism 66 may be adapted to assume the above-mentioned locked condition also when a second fluid pressure is greater than zero overpressure.

For a second fluid pressure equal to or higher than a second fluid pressure threshold, the second locking mechanism 66 is adapted to assume a released condition in which the second planet carrier 56 and the first sun gear 48 are free to rotate relative to the transmission housing 60. In such a condition, the biasing force from the first biasing member 70 does not exceed the force by which the second fluid pressure releases the two brake pads 88, 90 from contact with the second brake disc 84 such that there is no contact between the second brake disc 84 and any one of the brake pads 88, 90.

For at least one second intermediate pressure between zero overpressure and the second fluid pressure threshold, the second locking mechanism 66 is adapted to assume a slipping condition in which a relative rotation is allowed but braking torque is applied between the transmission housing 60 and the second planet carrier 56 and the first sun gear 48. In a slipping condition, there is contact between the second brake disc 84 and at least one of, preferably both, the brake pads 88, 90 but wherein the second brake disc 84 nevertheless is allowed to rotate relative to the brake pads 88, 90.

Moreover, again with reference to FIG. 3, in embodiments of the transmission assembly 38, the transmission housing 60 may comprise a transmission housing wall assembly 96 defining a transmission housing cavity 98 enclosing at least the common ring gear assembly 46, the first sun gear 48, the first planet carrier 50, the second sun gear 54 and the second planet carrier 56. Moreover, as indicated in FIG. 3, in embodiments of the transmission assembly 38, at least an external portion of each one of the first and second locking mechanisms 64, 66 is located on one side of the transmission housing wall assembly 96 and the transmission housing cavity 98 is located on an opposite side of the transmission housing wall assembly.

Purely by way of example, and as indicated in FIG. 3, the external portion of the first locking mechanism 64 may comprise the first brake disc 72 and the first brake calliper 74 and the external portion of the second locking mechanism 66 may comprise the second brake disc 84 and the second brake calliper 86.

Moreover, the transmission housing cavity may contain a transmission lubrication liquid (not shown in FIG. 3), wherein at least the external portion of each one of the first and second locking mechanisms 64, 66 is adapted not to be in contact with the transmission lubrication liquid.

Figure 4:
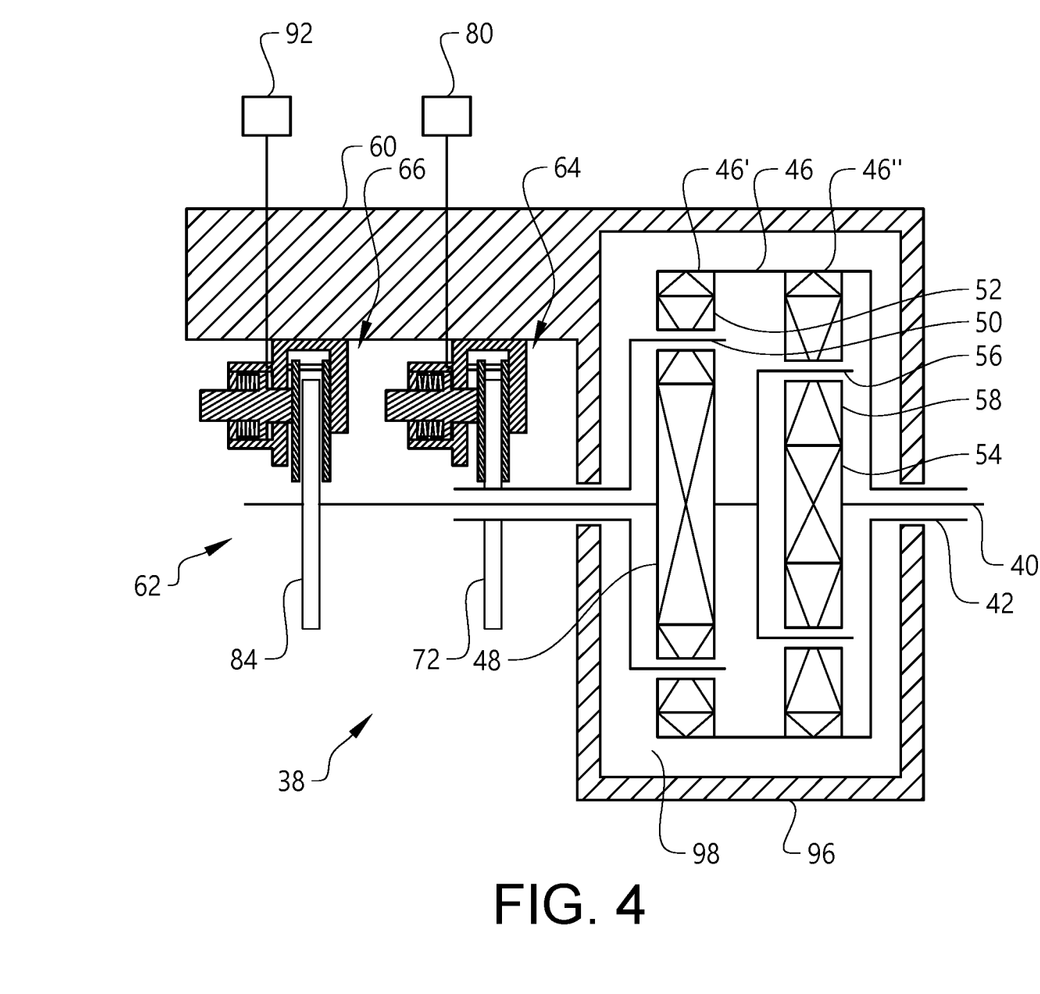
FIG. 4 is a schematic side view of the FIG. 3 transmission assembly in a first gear condition.
Figure 4A:
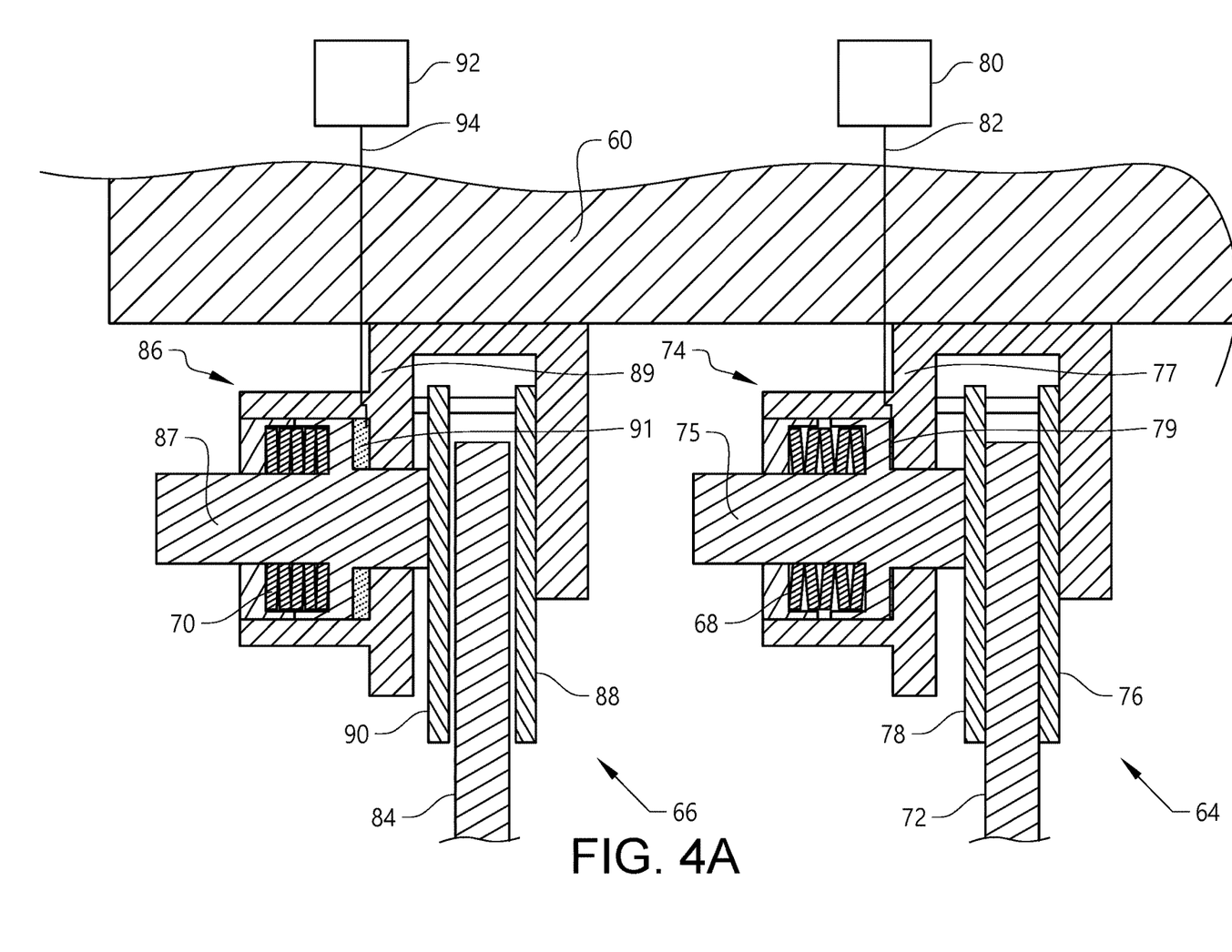
FIG. 4A illustrates a portion of the FIG. 4 embodiment.

FIG. 4 and FIG. 4A illustrate the FIG. 3 transmission assembly 38 in which the gear selection arrangement 62 assumes a first gear condition in which the first locking mechanism 64 assumes the locked condition and in which the second locking mechanism 66 assumes one of a set of second locking mechanism non-locked conditions.

As such, in the first gear condition, the first planet carrier 50 is locked to the transmission housing 60. Thus, in the first gear condition, power is transferred via each one of the first and second sun gears 48, 54 to the common ring gear assembly 46 and thereafter to the transmission output shaft 42.

As a non-limiting example, the set of second locking mechanism non-locked conditions comprises the released condition of the second locking mechanism 66.

As another non-limiting example, the second locking mechanism 66 is adapted to assume a slipping condition in which a relative rotation is allowed but braking torque is applied between the transmission housing 60 and each one of the second planet carrier 56 and the first sun gear 48. The set of second locking mechanism non-locked conditions comprises the slipping condition of the second locking mechanism 66.

Figure 5:
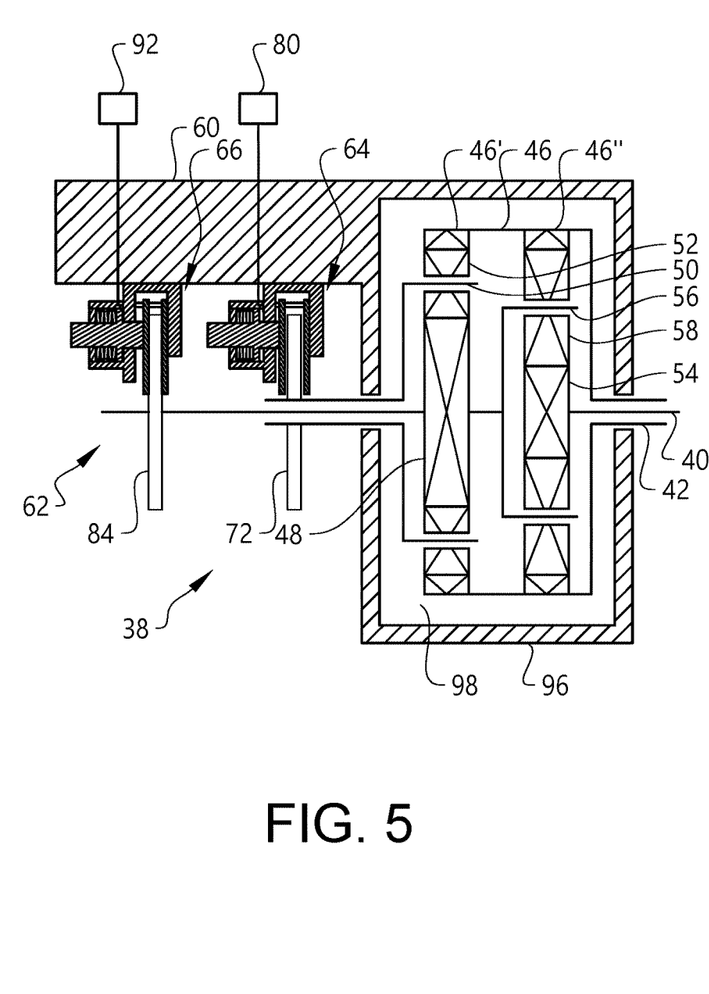
FIG. 5 is a schematic side view of the FIG. 3 transmission assembly in a second gear condition.
Figure 6:
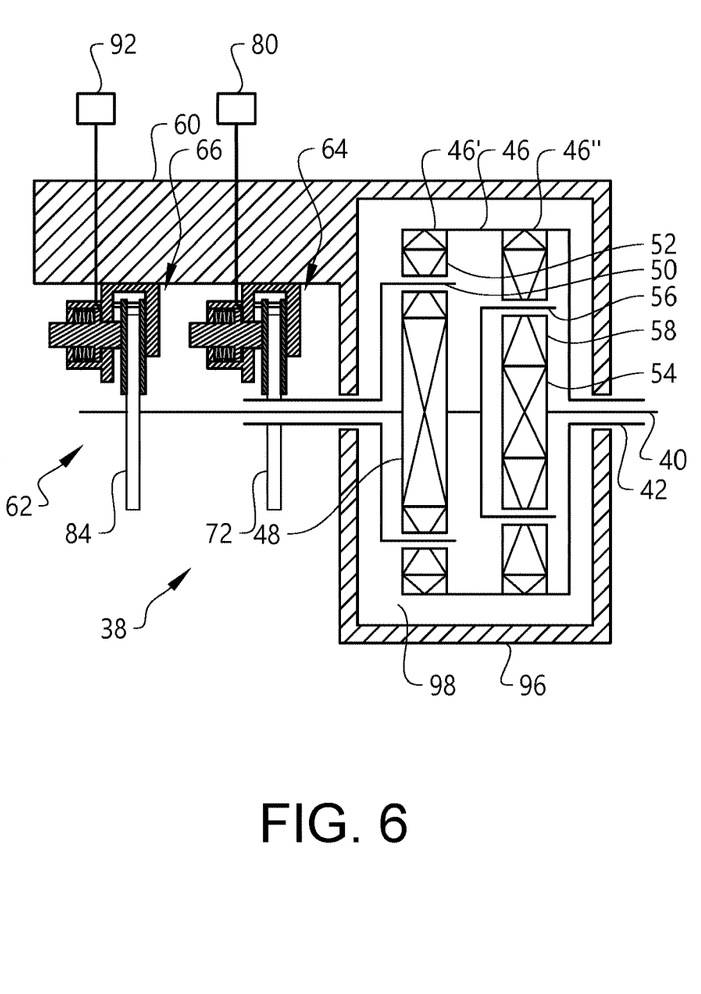
FIG. 6 is a schematic side view of the FIG. 3 transmission assembly in a locked condition.

FIG. 5 and FIG. 6 illustrate the FIG. 3 transmission assembly 38 in other conditions.

FIG. 5 illustrates the FIG. 3 transmission assembly 38 in which the gear selection arrangement 62 assumes a second gear condition in which the second locking mechanism 66 assumes the locked condition and in which the first locking mechanism 64 assumes one of a set of first locking mechanism non-locked conditions.

As such, in the second gear condition, the second planet carrier 56 and the first sun gear 48 are locked to the transmission housing 60. Thus, in the second gear condition, the first sun gear 48 is prevented from rotating relative to the transmission housing, as a consequence of which power is transferred only via the second sun gear 54 to the common ring gear assembly 46 and thereafter to the transmission output shaft 42.

As a non-limiting example, the set of first locking mechanism non-locked conditions comprises the released condition of the first locking mechanism 64.

As another non-limiting example, the first locking mechanism 64 is adapted to assume a slipping condition in which a relative rotation is allowed but braking torque is applied between the transmission housing 60 and the first planet carrier 50. The set of first locking mechanism non-locked conditions comprises the slipping condition of the first locking mechanism 64.

As a further example, and as indicated in FIG. 6, the gear selection arrangement 62 may be adapted to assume a locked condition in which the first locking mechanism 64 assumes the locked condition and the second locking mechanism 66 assumes the locked condition. In the locked condition illustrated in FIG. 6, the transmission assembly 38 will prevent the transmission output shaft 42 from rotating. As such, the locked condition may be used for preventing a set of ground engaging members 18', 18" connected to the transmission output shaft 42 from rotating, such that the transmission assembly 38 then acts as a parking brake.

Moreover, in embodiments of the transmission assembly 38 in which the second locking mechanism 66 is adapted to assume a slipping condition, the gear selection arrangement 62 may assume the first gear condition and the second locking mechanism 66 may be used for braking the set of ground engaging members 18', 18" when the vehicle is still moving by applying an actuating force to the second locking mechanism 66.

In a similar vein, in embodiments of the transmission assembly 38 in which the first locking mechanism 64 is adapted to assume a slipping condition, the gear selection arrangement 62 may assume the second gear condition and the first locking mechanism 64 may be used for braking the set of ground engaging members 18', 18" when the vehicle is still moving by applying an actuating force to the first locking mechanism 64.

Reverting to FIG. 2, the transmission input shaft 40 may be adapted to rotate around an axis of rotation extending in an axis of rotation direction A, wherein, as seen in the axis of rotation direction A, the electric motor 36 is located on the opposite side of the common ring gear assembly 46 as compared to the first and second locking mechanisms 64, 66.

With reference to FIG. 3, the present invention also relates to a method for operating a transmission assembly 38 comprising a common ring gear assembly 46, a first sun gear 48, a first planet carrier 50 carrying a set of planet gears 52, a second sun gear 54 and a second planet carrier 56 carrying a set of planet gears 58. The set of planet gears 52, 58 of each one of the first and second planet carriers 50, 56 meshes with the common ring gear assembly 46. The set of planet gears 52 of the first planet carrier 50 meshes with the first sun gear 48 and the set of planet gears 58 of the second planet carrier 56 meshes with the second sun gear 54. The transmission assembly further comprises a transmission housing 60. The transmission assembly is configured such that:

the second sun gear 54 is adapted to be connected to a transmission input shaft 40;

the common ring gear assembly 46 is adapted to be connected to a transmission output shaft 42, and the second planet carrier 56 and the first sun gear 48 are operatively connected to each other.

With reference to FIG. 4, the method comprises assuming a first gear condition of the transmission assembly 38 by locking the first planet carrier 50 to the transmission housing 60.

Purely by way of example, assuming the first gear condition further comprises arranging the second planet carrier 56 and the first sun gear 48 so as to rotate freely relative to the transmission housing 60.

As another non-limiting example, assuming the first gear condition further comprises allowing relative rotation but applying a braking torque between the transmission housing 60 and each one of the second planet carrier 56 and the first sun gear 48.

Moreover, with reference to FIG. 5, the method may further comprise assuming a second gear condition of the transmission assembly 38 by locking each one of the second planet carrier 56 and the first sun gear 48 to the transmission housing 60.

By way of example only, assuming the second gear condition may further comprise arranging the first planet carrier 50 so as to rotate freely relative to the transmission housing 60. Alternatively, assuming the second gear condition may further comprise allowing relative rotation but applying a braking torque between the transmission housing 60 and the first planet carrier 50.

Finally, with reference to FIG. 6, the method may further comprise assuming a locked condition of the transmission assembly by locking the first planet carrier 50 to the transmission housing 60 and by locking the second planet carrier 56 and the first sun gear 48 to the transmission housing 60.

It is to be understood that the present invention is not limited to the embodiments described above and illustrated in the drawings; rather, the skilled person will recognize that many changes and modifications may be made within the scope of the appended claims.

The invention claimed is:

1. A transmission assembly comprising a common ring gear assembly, a first sun gear, a first planet carrier carrying a set of planet gears, a second sun gear and a second planet carrier carrying a set of planet gears, said set of planet gears of each one of said first and second planet carriers meshing with said common ring gear assembly, said set of planet gears of said first planet carrier meshing with said first sun gear and said set of planet gears of said second planet carrier meshing with said second sun gear, said transmission assembly further comprising a transmission housing, said transmission assembly being configured such that:

said second sun gear is adapted to be connected to a transmission input shaft;

said common ring gear assembly is adapted to be connected to a transmission output shaft;

said second planet carrier and said first sun gear are operatively connected to each other;

wherein said transmission assembly comprises a gear selection arrangement comprising:

a first locking mechanism being adapted to be controlled by a first fluid pressure conducted to said first locking mechanism such that:

for at least a first fluid pressure equal to zero overpressure, said first locking mechanism is adapted to assume a locked condition in which said first planet carrier is locked to said transmission housing, and a second locking mechanism being adapted to be controlled by a second fluid pressure conducted to said second locking mechanism such that:

for at least a second fluid pressure equal to zero overpressure, said second locking mechanism is adapted to assume a locked condition in which said second planet carrier and said first sun gear are locked to said transmission housing, wherein said transmission housing comprises a transmission housing wall assembly defining a transmission housing cavity enclosing at least said common ring gear assembly, said first sun gear, said first planet carrier, said second sun gear and said second planet carrier, wherein at least an external portion of each one of said first and second locking mechanisms is located on one side of said transmission housing wall assembly and said transmission housing cavity is located on an opposite side of said transmission housing wall assembly, wherein said transmission assembly further comprises said transmission input shaft and said transmission output shaft, said transmission input shaft being connected to said second sun gear and said transmission output shaft being connected to said common ring gear assembly.

2. The transmission assembly according to claim 1, wherein said first locking mechanism further is adapted to assume a set of first locking mechanism non-locked conditions in which said first planet carrier is allowed to rotate relative to said transmission housing and wherein said second locking mechanism further is adapted to assume a set of second locking mechanism non-locked conditions in which said second planet carrier and said first sun gear are allowed to rotate relative to said transmission housing, whereby:
- for a first fluid pressure equal to or higher than a first fluid pressure threshold, said first locking mechanism is adapted to assume a released condition in which said first planet carrier is free to rotate relative to said transmission housing, said released condition forming part of said set of first locking mechanism non-locked conditions,
- for at least one first intermediate pressure between zero overpressure and said first fluid pressure threshold, said first locking mechanism is adapted to assume a slipping condition in which a relative rotation is allowed but braking torque is applied between said transmission housing and said first planet carrier, said slipping condition forming part of said set of first locking mechanism non-locked conditions,
- for a second fluid pressure equal to or higher than a second fluid pressure threshold, said second locking mechanism is adapted to assume a released condition in which said second planet carrier and said first sun gear are free to rotate relative to said transmission housing, said released condition forming part of said set of second locking mechanism non-locked conditions, and
- for at least one second intermediate pressure between zero overpressure and said second fluid pressure threshold, said second locking mechanism is adapted to assume a slipping condition in which a relative rotation is allowed but braking torque is applied between said transmission housing and said second planet carrier and said first sun gear, said slipping condition forming part of said set of second locking mechanism non-locked conditions.

3. The transmission assembly according to claim 1, wherein said first locking mechanism comprises a first biasing member adapted to bias said first locking mechanism so as to assume said locked condition and wherein said second locking mechanism comprises a second biasing member adapted to bias said second locking mechanism so as to assume said locked condition.

4. The transmission assembly according to claim 1, wherein said first locking mechanism comprises a first brake disc and a first brake calliper and wherein said second locking mechanism comprises a second brake disc and a second brake calliper.

5. The transmission assembly according to claim 4, wherein said external portion of said first locking mechanism comprises said first brake disc and said first brake calliper and wherein said external portion of said second locking mechanism comprises said second brake disc and said second brake calliper.

6. The transmission assembly according to claim 1, wherein said transmission housing cavity contains a transmission lubrication liquid, wherein at least said external portion of each one of said first and second locking mechanisms is adapted not to be in contact with said transmission lubrication liquid.

7. The transmission assembly according to claim 2, wherein said gear selection arrangement is adapted to assume a first gear condition in which said first locking mechanism assumes said locked condition and in which said second locking mechanism assumes one of said set of second locking mechanism non-locked conditions.

8. The transmission assembly according to claim 7, wherein said second locking mechanism assumes said slipping condition in said first gear condition.

9. The transmission assembly according to claim 2, wherein said gear selection arrangement is adapted to assume a second gear condition in which said second locking mechanism assumes said locked condition and in which said first locking mechanism assumes one of said set of first locking mechanism non-locked conditions.

10. The transmission assembly according to claim 9, wherein said first locking mechanism assumes said slipping condition in said second gear condition.

11. The transmission assembly according to claim 1, wherein said gear selection arrangement is adapted to assume a locked condition in which said first locking mechanism assumes said locked condition and said second locking mechanism assumes said locked condition.

12. The transmission assembly according to claim 1, wherein said common ring gear assembly comprises a first ring gear and a second ring gear being rotationally fixedly connected to each other, said set of planet gears of said first planet carrier meshing with said first ring gear and said set of planet gears of said second planet carrier meshing with said second ring gear.

13. The transmission assembly according to claim 1, wherein said common ring gear assembly comprises a common ring gear.

14. A powertrain comprising an electric motor, a set of ground engaging members and a transmission assembly according to claim 1, said electric motor being adapted to feed power to said transmission input shaft and said transmission output shaft being adapted to feed power to said set of ground engaging members.

15. The powertrain according to claim 14, wherein said electric motor is rotationally drivingly fixedly connected to said transmission input shaft.

16. The powertrain according to claim 14, wherein said transmission input shaft is adapted to rotate around an axis of rotation extending in an axis of rotation direction, wherein, as seen in said axis of rotation direction, said electric motor is located on the opposite side of said common ring gear assembly as compared to said first and second locking mechanisms.

17. A working machine comprising a transmission assembly according to claim 1, wherein said working machine comprises an axle connected to one or more ground engaging members.

* * * * *